May 26, 1970     T. H. RADGENS     3,513,800
INERTIA SIGNAL FOR VEHICLE
Filed Aug. 22, 1969
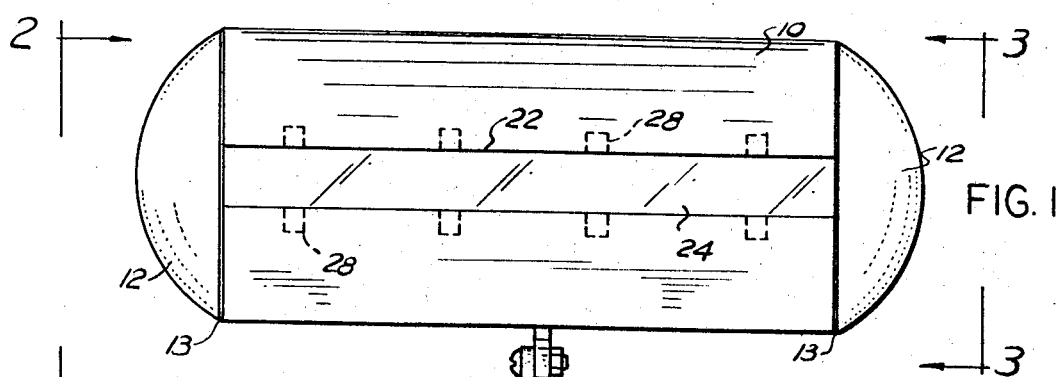
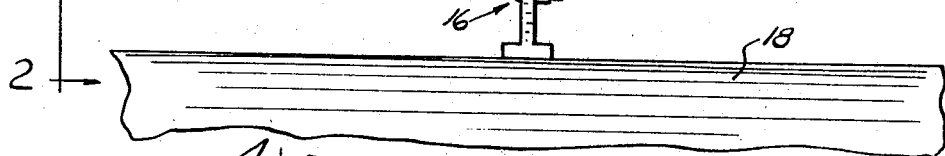
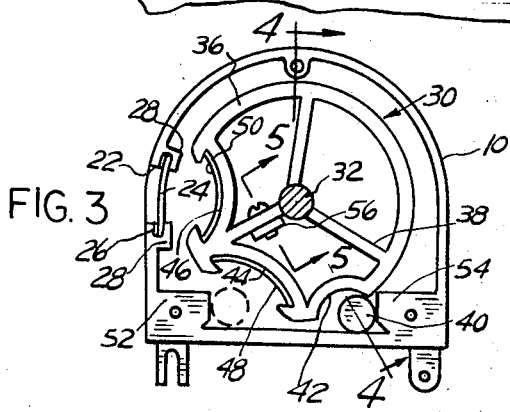
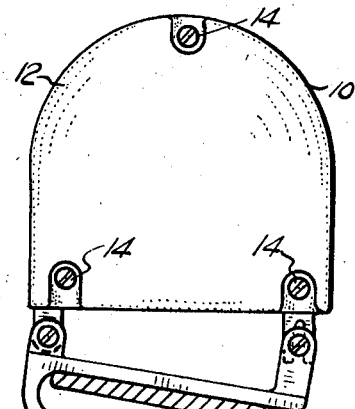
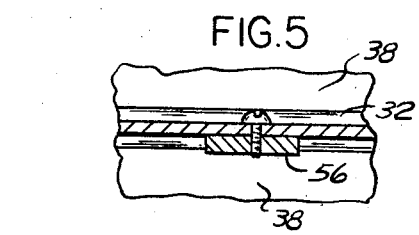
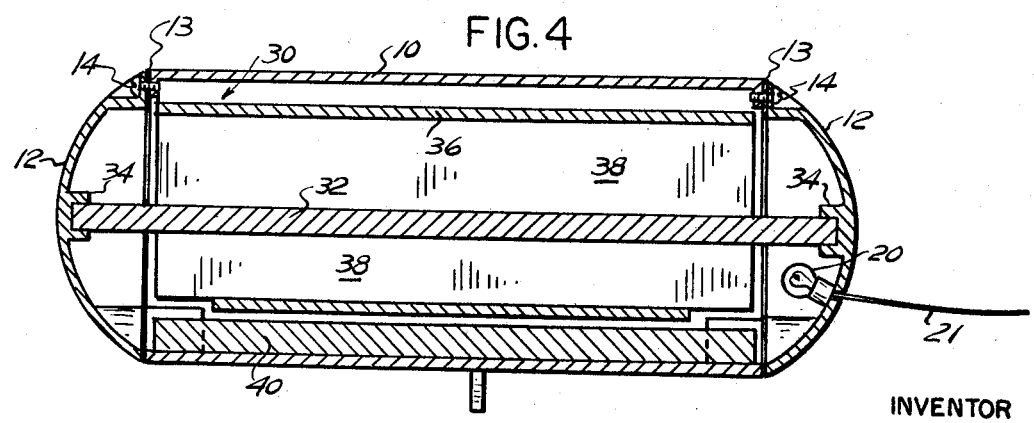
INVENTOR
THOMAS H. RADGENS
BY Adolph G. Martin
ATTORNEY

United States Patent Office 3,513,800
Patented May 26, 1970

3,513,800
INERTIA SIGNAL FOR VEHICLES
Thomas H. Radgens, 7340 Bingham,
Dearborn, Mich. 48126
Filed Aug. 22, 1969, Ser. No. 852,415
Int. Cl. B60g 1/54
U.S. Cl. 116—37      5 Claims

ABSTRACT OF THE DISCLOSURE

An inertia signal for vehicles having a housing with an elongated lens and containing a drum pivoted for rotation between two fixed limits of travel. An inertia member is movably engaged with the drum so as to rotate it to one limit of travel when the car is decelerating and to the other limit of travel when the car is being accelerated. Colored inserts are mountable on the pivoted drum so as automatically to indicate any appreciable changes in vehicular speed to the surrounding vehicular and pedestrian traffic.

BACKGROUND OF THE INVENTION

This invention relates to vehicle signals generally, and more particularly to an automatically operated signal for use in conjunction with the customery vehicle signaling system. Substantially all vehicle signals presently in use are driver operated, so that their effectiveness depends entirely upon driver reaction to a traffic situation. To eliminate this human element, the applicant has devised a signal which is automatically activated by any change of vehicular speed in excess of a pre-selected limit.

SUMMARY OF THE INVENTION

This invention comprises a housing with an elongated lens 24, and containing a drum 30 pivoted for rotation about its longitudinal axis. A cylindrical inertia member 40 in the housing 10 is engaged with the drum 30, and adapted to pivot it between two fixed limits of travel. Colored inserts 48 and 50 on the drum 30, are automatically shifted behind the lens 24 as the cylindrical inertia member 40 responds to any appreciable change in vehicular speed.

BRIEF DESCRIPTION OF THE DRAWING

FIG. 1 is a front elevation view showing the applicant's signal mounted on the bumper 18 of a motor vehicle.

FIG. 2 is an end elevation view, taken substantially on plane 2—2 in FIG. 1, showing the characteristic shape of the end caps 12.

FIG. 3 is an end elevation view, taken on plane 3—3 in FIG. 1 with the end cap 12 removed from the housing 10, showing structural details of the pivoted drum 30.

FIG. 4 is a section view, taken substantially on plane 4—4 in FIG. 3, showing the cylindrical inertia member 40 and the travel limit stops 52 and 54.

FIG. 5 is a section view, taken substantially on plane 5—5 in FIG. 3, showing the counter-weight 56 attached to one of the radial ribs 38 in the drum 30.

CONSTRUCTION

For a more detailed description of the invention, reference is made to the drawings in which numeral 10 designates a housing having two end caps 12 removably attached by screws 14. An adjustable mounting bracket 16 is provided on the housing 10 for ataching the signal to a vehicle bumper 18, partially shown in FIGS. 1 and 2. A light bulb 20 in one of the end caps 12 supplies illumination for the interior of the housing 10 when connected into the electrical system of the vehicle in the customary manner by means of conductors 21.

An opening 22, in one side of the housing 10, is covered by a lens 24 removably held in sealing engagement with a gasket 26 by spaced clips 28. An elongated drum 30 in the housing 10 is supported for limited rotation about its longitudinal axis by an axle 32 seated in sockets 34 on the end caps 12. The elongated drum 30 has a shell 36 supported by angularly spaced radial ribs 38 on the axle 32.

A cylindrical inertia member 40 in the housing 10 is engaged in an outwardly disposed cavity 42 in the shell 36 of the elongated member 30. A pair of concave sections 44 and 46 in the shell 36 have therein slidably removable colored inserts 48 and 50. A pair of stops 52 and 54 in the housing 10 provide respectively an advanced and a retracted position for the inertia member 40.

A counter-weight 56, removably attached to one of the radial ribs 38 in the elongated member 30, yieldably holds the cylindrical inertia member 40 in its retracted position adjacent the stop 54. The slidably removable inserts 48 and 50 are preferably colored with a fluorescent material so as to increase effectiveness of the signal, and eliminate the necessity for illuminating the interior of the housing 10 when the signal is attached to the rear bumper of a motor vehicle.

The preceding discussion completes a description of the structural details relating to the applicant's invention herein disclosed. However, to facilitate a more thorough and comprehensive understanding of the subject matter, a discussion is immediately hereinafter directed to the manner in which the device operates to accomplish its intended function.

OPERATION AND USE

In use, when the signal is to be associated with the forward end of a motor vehicle, it may be mounted on the front bumper of the vehicle by means of the adjustable bracket 16 as shown in FIG. 2. The bracket 16 is then adjusted so that the cylindrical inertia member 40 assumes a retracted position adjacent the stop 54. The counter-weight 56 will then yieldably hold the inertia member 40 in this position. The concave section 46 on the pivoted drum 30 is thereby positioned directly behind the lens 24 in the housing 10.

If no colored insert 50 has been placed in the concave section 46, no signal is transmitted to surrounding vehicular or pedestrian traffic when the vehicle is stationary, accelerating or traveling at a reasonably uniform rate of speed. However, when the vehicle is decelerating at a rate in excess of a pre-selected minimum, the cylindrical inertia member 40 develops a force of sufficient magnitude to overcome the force exerted by the counter-weight 56.

The cylindrical inertia member 40 thus moves to its advanced position, thereby placing the concave section 44 on the drum 30 directly behind the lens 24. A colored insert 48 in the concave section 44 would therefore automaticaly transmit a signal to the surrounding traffic without the necessity of any manual operation by the driver. By proper adjustment of the mounting bracket 16, the signal may be adapted for use on the back bumper of a motor vehicle.

As a rear signal, the cylindrical inertia member 40 is placed in contact with the stop 52, where it will remain when the vehicle is stationary, accelerating or traveling at a reasonably uniform rate of speed. However, when the vehicle is decelerating at a rate in excess of a pre-selected minimum, the cylindrical inertia member 40 will shift forward so as to place the concave section 46 on the drum 30 directly behind the lens 24. A colored insert 50 in the concave section 46 would then automatically transmit a signal to the surrounding traffic.

In practice, the use of fluorescent material on the colored inserts would eliminate the necessity of providing illumination for the rear signal. However, when the signal is attached to the front bumper, the interior of the housing should be illuminated by means of the bulb 20, connected into the electrical system of the vehicle in the customary manner by means of the conductors 21.

Based upon the foregoing discussion, the applicant is of the opinion that his invention has fulfilled a long-felt need in the field of vehicle signals, and that he has accordingly made a valuable contribution to the related art. However, while the invention was described with reference to the structural details of a single embodiment, it will be appreciated by those familiar with the art that the principles involved are susceptible of numerous other practical adaptations.

I therefore claim as new, and desire to secure by Letters Patent:

1. An inertia signal for vehicles comprising a housing having an opening therein, a lens over the opening in the housing, an elongated drum in the housing having therein an outwardly disposed cavity, means pivotally supporting the elongated drum for limited rotation about its longitudinal axis between two fixed travel limits, a movable inertia member in the housing retainably engaged in the outwardly disposed cavity, and at least one colored section on the elongated drum, such colored section being viewable through the lens in the housing when the elongated drum is at one travel limit and non-viewable through the lens when the elongated drum is at the other travel limit.

2. The inertia signal of claim 1 in which the movable inertia member comprises a cylinder rollably supported in the housing and disposed parallel to the elongated drum.

3. The inertia signal of claim 2 having in addition thereto means yieldably holding the elongated drum at one travel limit.

4. The inertia signal of claim 3 in which the colored section on the elongated drum comprises an insert removably attached to the drum.

5. The inertia signal of claim 1 having in addition thereto a source of light in the housing for illuminating the colored section on the elongated drum.

References Cited

UNITED STATES PATENTS

| | | | |
|---|---|---|---|
| 521,990 | 6/1894 | Root | 40—51 |
| 1,187,286 | 6/1916 | Dunsheath | 116—42 |
| 1,624,219 | 4/1927 | Cowdrey | 73—514 XR |
| 1,875,676 | 9/1932 | Taplin | 116—42 XR |
| 2,753,830 | 7/1956 | Pillsbury et al. | 40—51 |
| 2,798,321 | 7/1957 | Duff | 40—51 XR |

LOUIS J. CAPOZI, Primary Examiner

U.S. Cl. X.R.

40—68; 73—492; 116—35, 43